United States Patent [19]

Baier et al.

[11] Patent Number: 5,259,189
[45] Date of Patent: Nov. 9, 1993

[54] METHOD AND APPARATUS FOR MONITORING A CATALYTIC CONVERTER

[75] Inventors: Gunar Baier, Mannheim; Bernd Schumann, Eppelheim, both of Fed. Rep. of Germany

[73] Assignee: ABB Patent GmbH, Mannheim, Fed. Rep. of Germany

[21] Appl. No.: 805,581

[22] Filed: Dec. 11, 1991

[30] Foreign Application Priority Data

Dec. 11, 1990 [DE] Fed. Rep. of Germany ....... 4039429

[51] Int. Cl.$^5$ .............................................. F01N 3/20
[52] U.S. Cl. ......................................... 60/274; 60/276; 60/277; 123/691
[58] Field of Search ................... 60/274, 277, 276; 123/691

[56] References Cited

U.S. PATENT DOCUMENTS

| | | | |
|---|---|---|---|
| 4,079,714 | 3/1978 | Saito | 123/699 |
| 4,622,809 | 11/1986 | Abthoff | 60/274 |
| 4,870,938 | 10/1989 | Nakaniwa | 123/674 |
| 5,105,651 | 4/1992 | Gutmann | 73/118.1 |

Primary Examiner—Douglas Hart

[57] ABSTRACT

A method for monitoring a catalytic converter for vehicles having Otto engines includes monitoring the composition of exhaust gases leaving a catalytic converter. An apparatus for monitoring the catalytic converter includes a sensor for hydrogen and/or carbon monoxide, and a sensor for oxygen.

3 Claims, 1 Drawing Sheet

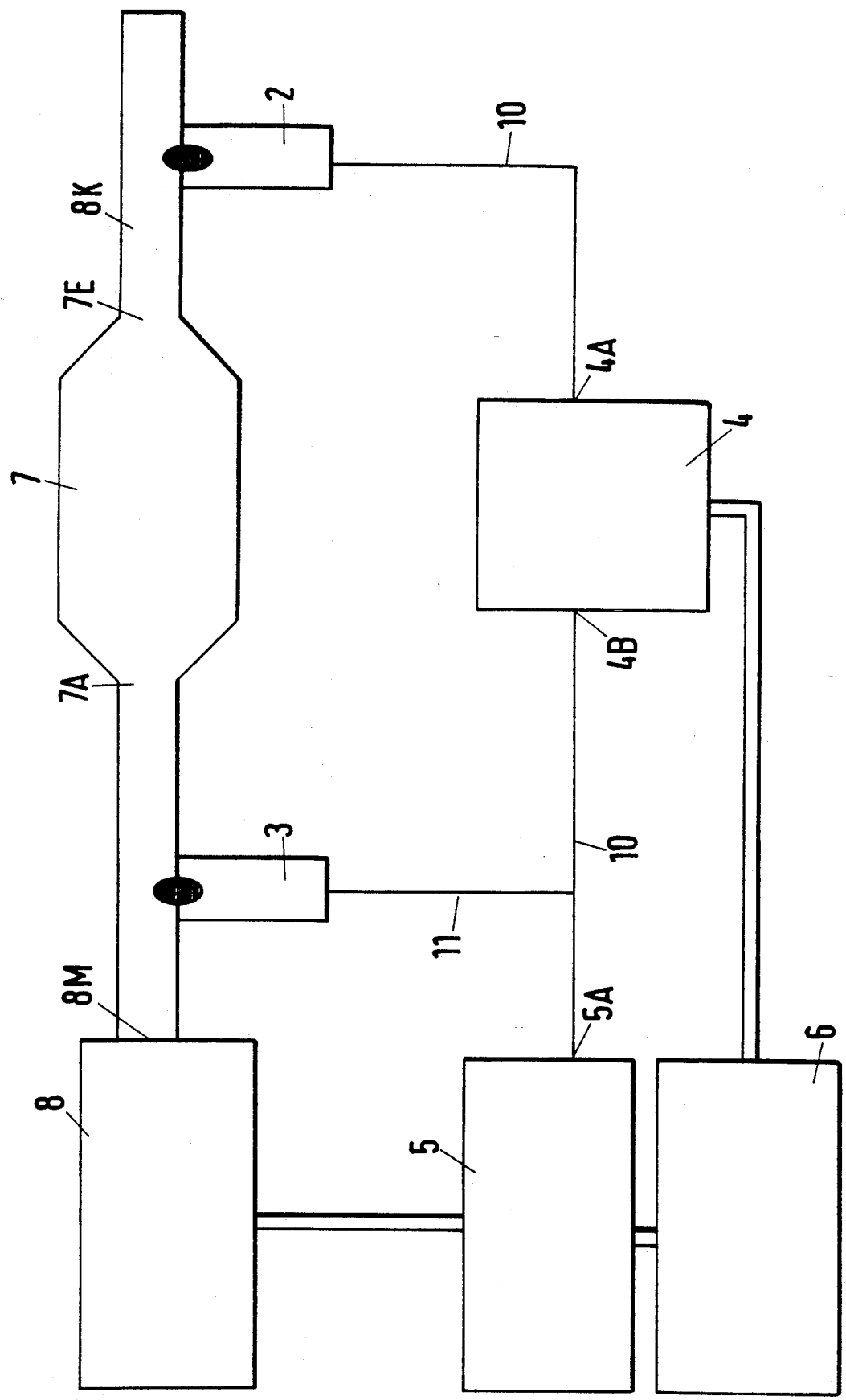

METHOD AND APPARATUS FOR MONITORING A CATALYTIC CONVERTER

The invention relates to a method for manufacturing a catalytic converter for motor vehicles, and to an apparatus for performing the method.

Such a method and apparatus are used when toxic substances are to be removed from exhaust gases of Otto engines by means of catalytic converters. In order to ensure the most complete possible removal of toxic substances from the exhaust gases of such Otto engines, the fuel-air ratio of the engines is regulated with a lambda sensor, and the exhaust gas is then carried through a three-way catalytic converter. That procedure oxidizes any still-combustible components such as carbon monoxide and hydrogen and reduces nitrogen oxides. The functional capability of such a catalytic converter decreases as the time in operation increases. It is therefore necessary to monitor the functional capacity of the catalytic converter at defined time intervals.

The standard method used previously includes ascertaining the exhaust emissions during a predetermined driving cycle, and because it requires simulation of the engine operating states and due to the measuring technology required, it is very time-consuming and expensive. German Published, Non-Prosecuted Application DE-OS 34 43 649 discloses another method for monitoring a catalytic converter. For that purpose, a respective lambda sensor is disposed both upstream and downstream of the catalytic converter. During the control of the fuel-air ratio, the control frequencies of the voltage signals of the two sensors are compared with one another. Since the effectiveness of a catalytic converter is determined by its ability to store oxygen, among other properties, conclusions about the functional capability of the catalytic converter can be drawn from the ratio of the two control frequencies. One disadvantage of such an apparatus is that the quotient of the control frequencies varies for every vehicle type and every catalytic converter system. The measurement variable is jointly determined not only by the effectiveness of the catalytic converter itself but also by the properties of the lambda sensors and of the control electronics.

It is accordingly an object of the invention to provide a method and an apparatus for monitoring a catalytic converter, which overcome the hereinafore-mentioned disadvantages of the heretofore-known methods and devices of this general type and with which the functional capability of a catalytic converter intended for Otto engines can be checked more easily than before.

With the foregoing and other objects in view there is provided, in accordance with the invention, a method for monitoring a catalytic converter for vehicles having Otto engines, which comprises monitoring the composition of exhaust gases leaving a catalytic converter.

In accordance with another mode of the invention, there is provided a method which comprises monitoring the content of hydrogen and/or carbon monoxide in the exhaust gases leaving the catalytic converter, and classifying the catalytic converter as defective if a threshold value is exceeded during the monitoring.

In accordance with a further mode of the invention, there is provided a method which comprises monitoring the catalytic converter with measuring sensors, and carrying out the monitoring of the catalytic converter only at a defined temperature of the measuring sensors and of the exhaust gases.

With the objects of the invention in view, there is also provided, in a motor vehicle having an Otto engine and a catalytic converter, an apparatus for monitoring the catalytic converter, comprising a first sensor for hydrogen and/or carbon monoxide, and a second sensor for oxygen.

In accordance with another feature of the invention, the second sensor is disposed upstream of the catalytic converter, and the first sensor is downstream of the catalytic converter, as seen in flow direction of exhaust gases.

In accordance with a further feature of the invention, the first and second sensors supply output signals, and there is provided a catalytic converter monitoring device receiving the output signals of the first and second sensors, and an engine control computer for regulating a fuel-air ratio in the engine, the engine control computer having an input receiving the output signal of the second sensor.

In accordance with an added feature of the invention, there is provided a diagnostic computer connected to the engine control computer and to the catalytic converter monitoring device.

In accordance with a concomitant feature of the invention, the first sensor is a ceramic solid electrolyte cell with electrocatalytically active electrodes disposed on a zirconium oxide solid electrolyte.

One advantage of the method according to the invention is that it is economical to perform. According to the invention, as mentioned above, one oxygen sensor is disposed upstream of the catalytic converter and a further sensor is disposed downstream of the catalytic converter, as viewed in the flow direction of the gas, the further sensor being capable of ascertaining the carbon monoxide content and/or the hydrogen content of the exhaust gas. The sensor disposed downstream of the catalytic converter is a ceramic solid electrolyte cell, with special electrocatalytically active electrodes that are disposed on a zirconium oxide solid electrolyte. The exhaust gas of a catalytic converter that is functioning properly is virtually free of carbon monoxide and hydrogen. The catalytic converter is also considered to be fully functional if small quantities of carbon and hydrogen are contained in the exhaust gas. However, a specified threshold value must not be exceeded.

The method according to the invention and the associated apparatus are provided in such a way that monitoring of the catalytic converter can be performed not only in a servicing facility or service station, but also during travel of the motor vehicle. Since most vehicles already have an oxygen sensor to detect the oxygen content in the exhaust gas, and that sensor is disposed upstream of the catalytic converter as viewed in the flow direction of the exhaust gas, then in order to monitor the catalytic converter in the servicing facility, a hydrogen and/or a carbon monoxide sensor need merely be disposed downstream of the catalytic converter in the flow of the exhaust gas. The difference between the output signals of the two sensors provides information on the composition of the exhaust gas leaving the catalytic converter. In particular, the magnitude of the differential signal is a function of the content of hydrogen and/or carbon monoxide.

According to the invention, the possibility exists of permanently providing any motor vehicle equipped with an Otto engine with such a test apparatus. To this end, the carbon monoxide and/or hydrogen sensor is installed permanently downstream of the catalytic converter. Its output signals are delivered to a catalytic converter monitoring unit, as mentioned above. As is also mentioned above, the output signal of the oxygen sensor is additionally delivered to an engine control computer, which is connected to the engine control system. As mentioned above, a diagnostic computer is connected to the engine control computer and to the catalytic converter monitoring unit. This unit processes the signals for the diagnostic computer. If monitoring of the catalytic converter function is continuous during operation of the motor vehicle, then it must be taken into account that during cold starting and in the warmup phase and in changes of engine power, there will be increased concentrations of carbon monoxide and hydrogen in the engine exhaust gas. Analysis of the engine status is performed by the diagnostic computer. Examples of decision variables may be the coolant temperature, the speed variants of the engine, and the voltage signal of the oxygen sensor. It should also be taken into account that the exhaust gas temperature and thus the operating temperatures of the sensors vary. In order to ensure that measurements will be made only at defined operating states of the engine, the signals of the sensors are recorded only at certain times during the trip, as a function of the engine analysis by the diagnostic computer. The recording is performed whenever the catalytic converter is charged, for instance during engine operation at a high vehicle speed, in such a way that its functional capability is tested up to the hundred percent limit. The tests of the functional capability of the catalytic converter are determined by the diagnostic computer. The measurement signals are carried to the diagnostic computer, which then reports the catalytic converter as malfunctioning, if a certain threshold signal is exceeded several times. In order to avoid malfunction reports by the test apparatus during dynamic vehicle operation, it is especially advantageous to average the measurement signals over a certain period of time, thereby weighting brief emission peaks less heavily than a long-term increase in sensor potential during constant vehicle operation. This makes it possible to carry out long-term, discontinuous monitoring of the catalytic converter. Checks can then be made at certain intervals in terms of hours of operation, for instance. According to the invention, the possibility exists of equipping the sensors with thermocouples. The range in which the voltage signal of the sensors is to be evaluated can be defined by means of a temperature measurement. This makes it easier to make a comparison with a predetermined threshold value that defines the degree of catalytic converter aging.

Other features which are considered as characteristic for the invention are set forth in the appended claims.

Although the invention is illustrated and described herein as embodied in a method and an apparatus for monitoring a catalytic converter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

The drawing is a diagrammatic and block circuit diagram of an apparatus for carrying out a method of monitoring a catalytic converter according to the invention.

Referring now to the single figure of the drawing in detail, there is seen an apparatus, which has a first hydrogen and/or carbon monoxide sensor 2, a second oxygen sensor 3, a catalytic converter monitoring device 4, an engine control computer 5 and a diagnostic computer 6. The hydrogen and/or carbon monoxide sensor 2 is disposed at an exhaust gas outlet 7E of a catalytic converter 7, while the oxygen sensor 3 is installed at an exhaust gas inlet 7A of the catalytic converter 7. An output signal of the hydrogen and/or carbon monoxide sensor 2 is delivered over a line 10 to an input 4A of the catalytic converter control unit 4. An output signal of the oxygen sensor 3 is delivered over a line 11 to an input 4B of the catalytic converter monitoring device 4 and to a signal input 5A of the engine control computer 5.

An engine 8 emits exhaust gas 8M which is delivered to the catalytic converter 7 and is regulated by the engine control computer 5. The engine control computer 5 generates a closed-loop control signal from the output-signal of the oxygen sensor 3, for adjusting the fuel-air ratio in the engine 8. A sensor described in German Published, Non-Prosecuted Application DE-OS 40 21 929 is preferentially suitable as the sensor 2. Preferably, the sensor has one measuring electrode and one reference electrode, and is capable of detecting hydrogen and carbon monoxide. Exhaust gas 8K leaving the catalytic converter 7 is delivered to the measuring electrode. At a defined operating temperature of the sensor 2, a potential between the two electrodes develops, which is delivered as an output signal over the line 10 to the catalytic converter monitoring device 4. The catalytic converter monitoring device 4 forms a differential signal from the two signals of the sensors 2 and 3, which corresponds to the content of hydrogen and/or carbon monoxide of the exhaust gas 8K. If the signal generated by the catalytic converter monitoring device 4 exceeds a defined threshold value, then a functional incapacity of the catalytic converter 7 is indicated. The instant and duration of monitoring of the catalytic converter 7 can be controlled with the aid of the diagnostic computer 6.

We claim:

1. A method for monitoring a catalytic converter for a vehicle having an Otto engine, comprising the steps of monitoring by measuring sensors of the content of hydrogen and carbon monoxide in the exhaust gases leaving the catalytic converter; carrying out the monitoring of the catalytic converter only at a defined temperature of the measuring sensors and of the exhaust gases and then classifying the catalytic converter as defective if a threshold value is exceeded.

2. An apparatus for monitoring a catalytic converter for vehicles with a first sensor for detecting hydrogen and carbon monoxide disposed downstream of the catalytic converter, and a second sensor for detecting oxygen disposed upstream of the catalytic converter with respect to the flow direction of the exhaust gases, and including a catalytic converter monitoring device receiving the output signals supplied by said first and second sensors, and an engine control computer for regulating the fuel-air ration in the engine provided with an input receiving the output signal of said second sensor, and including a diagnostic computer connected to said engine control computer and to said catalytic converter monitoring device.

3. The apparatus according to claim 2, wherein said first sensor is a ceramic solid electrolyte cell with electrocatalytically active electrodes disposed on the zirconium oxide solid electrolyte thereof.

* * * * *